United States Patent
Autrey et al.

(10) Patent No.: US 6,732,125 B1
(45) Date of Patent: May 4, 2004

(54) SELF ARCHIVING LOG STRUCTURED VOLUME WITH INTRINSIC DATA PROTECTION

(75) Inventors: John Charles Autrey, Norcross, GA (US); Marcia Reid Martin, Longmont, CO (US); Jon Mark Holdman, Wheat Ridge, CO (US)

(73) Assignee: Storage Technology Corporation, Louisville, CO (US)

(*) Notice: Subject to any disclaimer, the term of this patent is extended or adjusted under 35 U.S.C. 154(b) by 449 days.

(21) Appl. No.: 09/657,291

(22) Filed: Sep. 8, 2000

(51) Int. Cl.$^7$ ................................. G06F 17/30
(52) U.S. Cl. ............ 707/204; 707/200; 707/202; 707/203; 707/205; 714/6; 714/8; 714/20; 711/161; 711/162; 711/173
(58) Field of Search ................ 707/203, 204, 707/200, 202, 205; 714/6, 8, 20; 711/173, 162, 161

(56) References Cited

U.S. PATENT DOCUMENTS

| | | | | |
|---|---|---|---|---|
| 5,638,509 A | * | 6/1997 | Dunphy et al. | 714/20 |
| 5,640,561 A | * | 6/1997 | Satoh et al. | 707/202 |
| 5,819,292 A | | 10/1998 | Hitz et al. | 707/203 |
| 5,907,672 A | * | 5/1999 | Matze et al. | 714/8 |
| 6,021,408 A | | 2/2000 | Ledain et al. | 707/8 |
| 6,035,412 A | * | 3/2000 | Tamer et al. | 714/6 |
| 6,047,294 A | * | 4/2000 | Deshayes et al. | 707/204 |
| 6,212,531 B1 | * | 4/2001 | Blea et al. | 707/204 |
| 6,269,431 B1 | * | 7/2001 | Dunham | 711/162 |
| 6,289,426 B1 | * | 9/2001 | Maffezzoni et al. | 711/173 |
| 6,304,980 B1 | * | 10/2001 | Beardsley et al. | 714/6 |
| 6,353,878 B1 | * | 3/2002 | Dunham | 711/162 |
| 6,397,307 B2 | * | 5/2002 | Ohran | 711/161 |
| 6,397,308 B1 | * | 5/2002 | Ofek et al. | 711/162 |
| 6,490,598 B1 | * | 12/2002 | Taylor | 707/204 |
| 6,505,216 B1 | * | 1/2003 | Schutzman et al. | 707/204 |
| 6,549,921 B1 | * | 4/2003 | Ofek | 707/204 |
| 6,549,992 B1 | * | 4/2003 | Armangau et al. | 711/162 |

OTHER PUBLICATIONS

Kohl J T et al "HighLight : Using a Log–structured File System for Tertiary Storage Management". USENIX Association. Proceedings of the Winter 1993 USENIX Conference, San Diego, CA, USA, Jan. 25–29, 1993, pp. 435–447.

Seltzer M et al: "An implementation of a log–structured file system for UNIX". USENIX Assocation Proceedings of the Winter 1993 USENIX Conference, San Diego, CA, USA, Jan. 25–29, 1993, pp. 201–220.

Green R J et al.: "Designing a fast on–line backup system for a log–structured file system", Digital Technical Journal, 1996, Digital Equipment Corp, USA, vol. 8, No. 2, pp. 32–45.

(List continued on next page.)

*Primary Examiner*—Thuy N. Pardo
(74) *Attorney, Agent, or Firm*—Brooks Kushman P.C.

(57) ABSTRACT

A data backup system for use with a server running a storage application that writes and reads data blocks. The system includes a self archiving log structured volume for copying blocks from an active volume while the application is running without contending with the application for access to data blocks. The volume records the result of every write event in a new location in primary storage, forming a chronological log of the state changes the volume undergoes. The volume records in the log the points in time (synch events) when the blocks of the volume are in a consistent state with respect to the application. The system further includes backing storage to store the archived blocks and synch events of the volume. The volume migrates inactive segments of its log to the backing storage and ensures that a volume can be reconstructed from a fixed number of log segments.

6 Claims, 7 Drawing Sheets

OTHER PUBLICATIONS

"Database Server Journal Backup Automation Technique". IBM Technical Disclosure Bulletin, IBM Corp. New York, US, vol. 36, No. 2, Feb. 1, 1993, p. 463.

Rosenblum M et al.: "The Design and Implementation of a Log–structured File System". Operating Systems Review (SIGOPS), ACM Headquarters, New York, US, vol. 25, No. 5, 1991, pp. 1–15.

Muth P et al: "Design, implementation, and performance of the LHAM log–structured history data access method". Proceedings of the Twenty–fourth International Conference on Very–Large Databases, Proceedings of $24^{th}$ Annual International Conference on Very Large Data Bases (VLDB '98), New York, NY, USA, Aug. 24–27, 1998, pp. 452–463.

* cited by examiner

| Block | Active seg:t:offset |
|---|---|
| 1 | 2:0 |
| 2 | 2:2 |
| 3 | 3:0 |
| 4 | 2:3 |

50

| | Block | Contents |
|---|---|---|
| | Empty | Empty |
| 3 | Empty | Empty |
| | Empty | Empty |
| | 3 | $ |

48

| | Block | Contents |
|---|---|---|
| | 4 | # |
| 2 | 2 | @ |
| | Synch | 01/10/2000:0100 |
| | 1 | Static |

46

| | Block | Contents |
|---|---|---|
| | 2 | "3" |
| 1 | 4 | "2" |
| | 3 | 1 |
| | 1 | Static |

44

| | Block | Contents |
|---|---|---|
| | 2 | C |
| 0 | 4 | B |
| | 3 | A |
| | Synch | 01/01/2000:0055 |

40

Time 42

SELF ARCHIVING LOG STRUCTURED VOLUME WITH INTRINSIC DATA PROTECTION

TECHNICAL FIELD

The present invention relates generally to methods and systems for backing up data and, more particularly, a self protecting storage method and system for backing up data using a self archiving log structured volume.

BACKGROUND ART

Conventional data backup is expensive, time consuming, and risky. Users spend much time and money installing, configuring, maintaining, and operating enterprise backup systems. Despite this effort, many users still lose valuable data because the needed file version or data base transaction has not been backed up or cannot be recovered in a reasonable amount of time.

Backed-up data is lost because of bandwidth constraints and administration errors. A conventional backup system competes for network and computational bandwidth that a user requires for other operations performed on a network. File activity and network traffic generated by a backup system can slow a network to a crawl. The need for around the clock networking operations has squeezed the time available for backup even further. Administrators must constantly trade off the risk of losing a file against data center response time. Backup system vendors have responded to this challenge by developing configuration options to wring the most performance out of the available bandwidth. These options provide some help to the bandwidth constraint problem, but increase the risk that a file may not be backed up at all due to an administrative error.

The risk of administrative error is compounded by the wide variety of computers, operating systems, software packages, file systems, and security domains that are present in a modern distributed network. Conventional backup systems have a client component that must abide by the native file systems' network protocols and security policies. Different software must be installed and configured for each variation. High performance systems must be adapted to the host hardware increasing both administrative expense and risk of mis-configuration. On top of all this, backups must be scheduled over a network where services may not be available at the time that they are needed. Each one of these complications adds to the risk that a file may not be backed up frequently enough or not backed up at all.

A further problem with conventional backup methods and systems is that they only periodically backup data. Thus, unlike data significant events, backups occur at fixed intervals and much important data may not be copied at all during the backup periods. Recreating data lost in the interim between backup periods is expensive.

Accordingly, what is needed is a method and system for backing up data that greatly reduces administrative expense and greatly increases the likelihood that a needed file version is available.

SUMMARY OF THE INVENTION

Accordingly, it is an object of the present invention to provide a self protecting storage method and system for backing up data which uses a self archiving log structured volume.

It is another object of the present invention to provide a self archiving log structured volume operable for transferring to backing storage all changes made to a volume of data controlled by a storage application.

Terms for describing the present invention will be now be defined. A block is a fixed length of digital storage. A volume is a sequence of numbered blocks of a fixed maximum length. A block number identifies a particular block in the sequence. At a minimum, a volume must service read and write events.

A read event copies the data from a sequence of blocks identified by the originator of the event to storage controlled by the originator. A write event copies the data from the originator of the event to a sequence of blocks identified by the originator.

A storage application organizes the information on a volume and maintains consistent relationships among the blocks of the volume. A storage application or an agent cooperating with the storage application sends a synchronization event (synch) to the volume when the blocks of the volume have been placed in a consistent state.

A log is a time sequence of entries for all write events and synch events to a volume. Each write event entry includes the block number being written and the contents of the block being transferred. Each synch event entry contains the time of the event. A log entry for a write event is active until it is superseded by a later write event entry for the same block number. Afterwards the superceded entry is inactive.

A log structured volume performs the same services as an ordinary volume. It is composed of a log and an index that associates each volume block number with its corresponding active log entry. It satisfies write requests by adding an entry for the block to the end of the log and updating the index entry for the block number with the log location of the new active entry. It satisfies a read request for a particular block by looking up the location of the active entry for the requested block in the index and copying the data from the active entry to the originator. In accordance with the present invention, a self archiving log structured volume is a log structured volume that guarantees that all blocks referenced from its index are present in a finite length of its log.

Primary storage is a random-access digital medium, such as RAM or magnetic disk, where the log and index are stored, and from which the volume satisfies the read and write events initiated by the storage application.

A backing storage is an archival digital medium, such as magnetic tape, magnetic disk, optical tape, or optical disk. A segment is a continuous portion of the log that can be transferred from primary storage to the backing storage as a unit.

A snapshot of a volume is a record of the state of the volume at a selected point in the log. A snapshot of a log structured volume is reconstructed from the log by filling an empty index with block/log position relationships from the log entries to the index, scanning backwards in time from the selected point, and ignoring any duplicate entries for a block that occurred earlier in the log. If the selected point is a synch entry, the snapshot is in a consistent state with respect to the storage application that controls the volume. The scan terminates when the index contains an entry for all of the blocks of a volume or the scanner reaches the beginning of the log, whichever comes first.

In carrying out the above objects and other objects, the present invention provides a self archiving log structured volume. The self archiving log structured volume is a log structured volume that guarantees all blocks referenced from its index are present in a finite length of its log (reconstruction length) and moves inactive segments of the log to and from backing storage. When an addition to the log pushes an active log entry past the reconstruction length, the guarantee is maintained by copying the contents of this active entry to the beginning of the log and updating the index to reflect its new position. The log entry that was copied is now inactive and may be pushed past the reconstruction length and migrated to backing storage as described below. The amount of primary storage allotted to a self archiving log structured volume can be limited to a small multiple of the reconstruction length. After an inactive segment has been copied to the backing storage, the primary storage allotted to that segment becomes available to be added to the beginning of the log as a new current segment.

The self archiving log structured volume moves inactive segments of the log to a backing storage. When migrating to the backing storage, this volume may reduce the size of the log by ignoring earlier versions of a duplicated block within the segment. This action reduces the time granularity of the archived portions, but does not affect its consistency as long as segments are archived on synch event boundaries. Because synch events are captured in the log, the self archiving log structured volume may move the segments without the knowledge of the storage application that owns the volume and still maintain the integrity of the storage application.

Because of the reconstruction length guarantee and the means for implementing the guarantee, the stream of log entries in a self archiving log structured volume forms a sequence of snapshots of the state of the volume. A snapshot of a self archiving log structured volume is reconstructed the same way as for an ordinary log structured volume, except that the scan terminates when it exceeds the reconstruction length from the selected point in the log. A snapshot may start at any log entry. A consistent snapshot must start with a synch entry.

A snapshot sequence of a self archiving log structured volume is constructed for an interval (TN) from the beginning time (TB) to the ending time (TE) by adding to a snapshot of time TE all of the log entries occurring between TE and TB. To move forward in time from TB to an intermediate time (TI) the index is rebuilt by scanning the log forward in time from TB to TI, replacing any index entries that have been superceded. To move backwards in time from TI to TB, the log is scanned backward from TI to TB, replacing any index entries for blocks which were written earlier.

A recovery volume is an area of primary storage upon which a snapshot or snapshot sequence has been copied, consisting of a log and an index organized similarly as a self archiving log structured volume. To a storage application, a recovery volume is indistinguishable from the original volume of which it is an archival copy.

Further, in carrying out the above object and other objects, the present invention provides a data backup system for use with a server running a storage application that writes and read data blocks to and from a volume. The data backup system includes the self archiving log structured volume, primary storage, backing storage, a method for creating recovery volumes by copying snapshots and snapshot sequences from the log (whether from primary storage, backing storage, or both) to primary storage, and a method for manipulating the index of a recovery volume containing a snapshot sequence so as to move the view of the recovery volume apparent to the storage application forward and backward in time.

In summary, the self archiving log structured volume is operable to migrate inactive segments of the log to the backing storage. The self archiving log structured volume is operable to ensure that a volume can be reconstructed from a fixed number of log segments. The archiving process is asynchronous and concurrent with the normal operation of any storage application using the self archiving log structured volume as a data store.

The advantages of the present invention are numerous. Data is protected soon after it is written and all versions of a data object are recoverable. Further, data protection does not depend on operator action and data recovery is fast, easy, and reliable. Also, operations for protecting data do not contend with applications for time or resources.

The above object and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
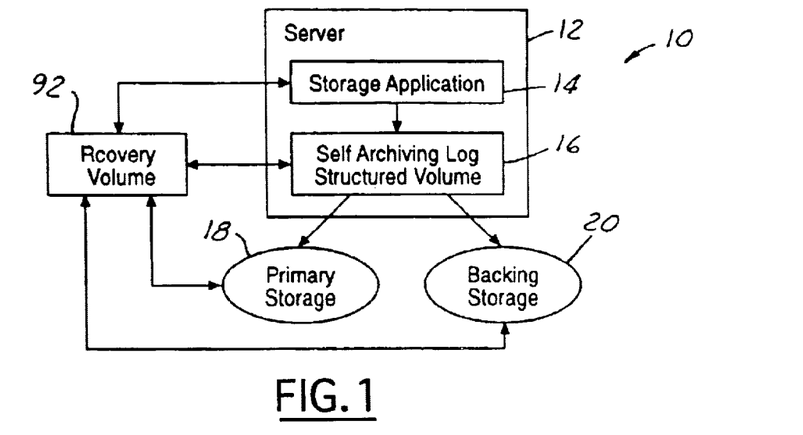
FIG. 1 illustrates a block diagram of a self protecting data backup system in accordance with the present invention.

Referring now to FIG. 1, a block diagram of a self protecting data backup system 10 in accordance with the present invention is shown. Self protecting data backup system 10 includes a server 12, a storage application 14, a self archiving log structured volume 16, a primary storage 18, and a backing storage 20. In operation, server 12 runs a storage application 14 that writes and reads data blocks to and from self archiving log structured volume 16. Self archiving log structured volume 16 is operable to copy data blocks from its log on primary storage 18 to backing storage 20 while storage application 14 is running and without contending with the storage application for access to data blocks on the primary storage.

To solve the problems associated with conventional backup systems, self archiving log structured volume 16 captures every written block, and captures synch events generated by the activity of storage application 14, continuously logging the writes and synchs first to primary storage 18 and subsequently to backing storage 20. The method of organizing the log enables the use of high speed data movers for both the archiving and recovery operations when such movers are available. Self protecting data backup system 10 enables users to view the state of a recovered volume at any point in time using familiar desktop tools, index and archive file systems offline without impacting regular server operations, recover every version of a file which has been written, view the state of a recovered volume as it changes over time, and allow viruses and other corruptions to be traced back in time to the point where they first occurred. Self protecting data backup system 10 simplifies administration and increases data security by saving every version of a file that has been written, reducing the possibility of error by eliminating many backup administrative activities, simplifies the management of associated tape libraries, and does not compete with storage applications for network bandwidth or access to active data.

Self archiving log structured volume 16 is operable to capture all block level storage application 14 activity in a segmented log. Self archiving log structured volume 16 records synch events in a log to provide many consistent "movie frames" of the activity of storage application 14. The synch capture decouples the data protection mechanism operation of self archiving log structured volume 16 from the operations of server 12. Self archiving log structured volume 16 uses a working set manager to migrate inactive segments of the log in volume 16 to and from primary and backing storage 18 and 20 and ensures that a volume can be reconstructed from a fixed number of log segments. Self archiving log structured volume 16 uses a recovery volume interface to present a portion of a log to storage application 14 and move the presented portion backward and forward in archival time by manipulating the index.

Figure 2:
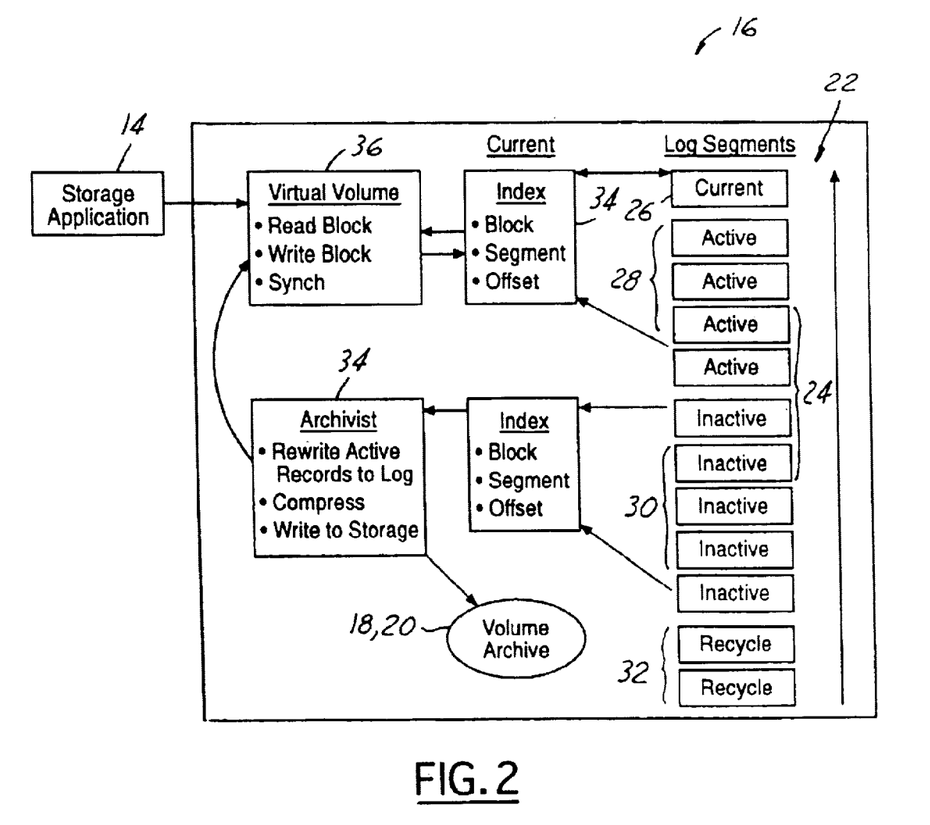
FIG. 2 illustrates a block diagram of a self archiving log structured volume in accordance with the present invention.

Referring now to FIG. 2 with continual reference to FIG. 1, a block diagram of self archiving log structured volume 16 in accordance with the present invention is shown. Self archiving log structured volume 16 includes a log 22 having a plurality of log segments 24. Log segments 24 include a current log segment 26, active log segments 28, inactive log segments 30, and recycle log segments 32. Log 22 also includes an index 34 which shows the current position of each block in the log. To storage application 14, self archiving log structured volume 16 acts like a normal volume 36 servicing read block and write block requests and recognizing synch events.

In general, self archiving log structured volume 16 has a record of every write transaction and a record of every synch event. Thus, a volume can be reconstructed at any point in time. To reconstruct a volume, for instance, from a given synch point, data backup system 10 seeks in log 22 back to the given synch point and then traces back through the log to rebuild the index of data blocks.

In operation, self archiving log structured volume 16 satisfies write block requests by copying the block to the end of log 22 and updating index 34 with the current position of that block in the log. Self archiving log structured volume 16 satisfies a read block request by looking up the needed block in index 34 and copying it from log 22. Self archiving log structured volume 16 records a synch event by writing a special block to log 22 and updating the log with the date, time, and other information describing the synch event.

Log 22 is divided into equal size segments 24 which are in a time sequential order and may be maintained on RAM, disk, tape, or any digital medium satisfying the definition of primary storage. Blocks are always written to current segment 26. When current segment 26 is full it becomes an active segment 28 and a new current segment 26 is drawn from a recycle pool of recycle segments 32. The set of active segments 28 plus the current segment 26 contain all blocks which are referenced from index 34. Current segment 26 and active segments 28 make up a working set of segments from which all write requests are satisfied. The working set of segments is a fixed size. This fixed size determines the reconstruction length.

A volume index can be constructed beginning at any synch point by scanning backwards in log 22 and updating the index entry for each block to the most recent position in the log. The maximum length of the scan is the length of the working set of segments and one additional segment. The backward scan may stop earlier if all volume blocks are accounted. A valid volume must account only for blocks that have actually been written so index 34 may not be full. When the working set of segments becomes full the oldest active segment 28 is designated as an inactive segment 30. An inactive block may be read by an offline process, but it is not part of the working set of segments. Inactive segments 30 may then be compressed and archived by archivist 34. After being compressed and archived, an inactive segment 30 becomes a recycle segment 32.

A segment manager handles state transitions between log segments, their archiving, and their migration to backing storage 20. The size of each segment, the number of segments of each type, and the media on which a segment of a given type is stored is determined by policy. A policy which emphasizes response time will store many segments in RAM and disk at the expense of virtual volume size. At the other extreme, a policy which emphasizes volume size will store only current segment 26 and index 34 on disk and will satisfy a read request by retrieving working set segments from tape.

Figure 3:
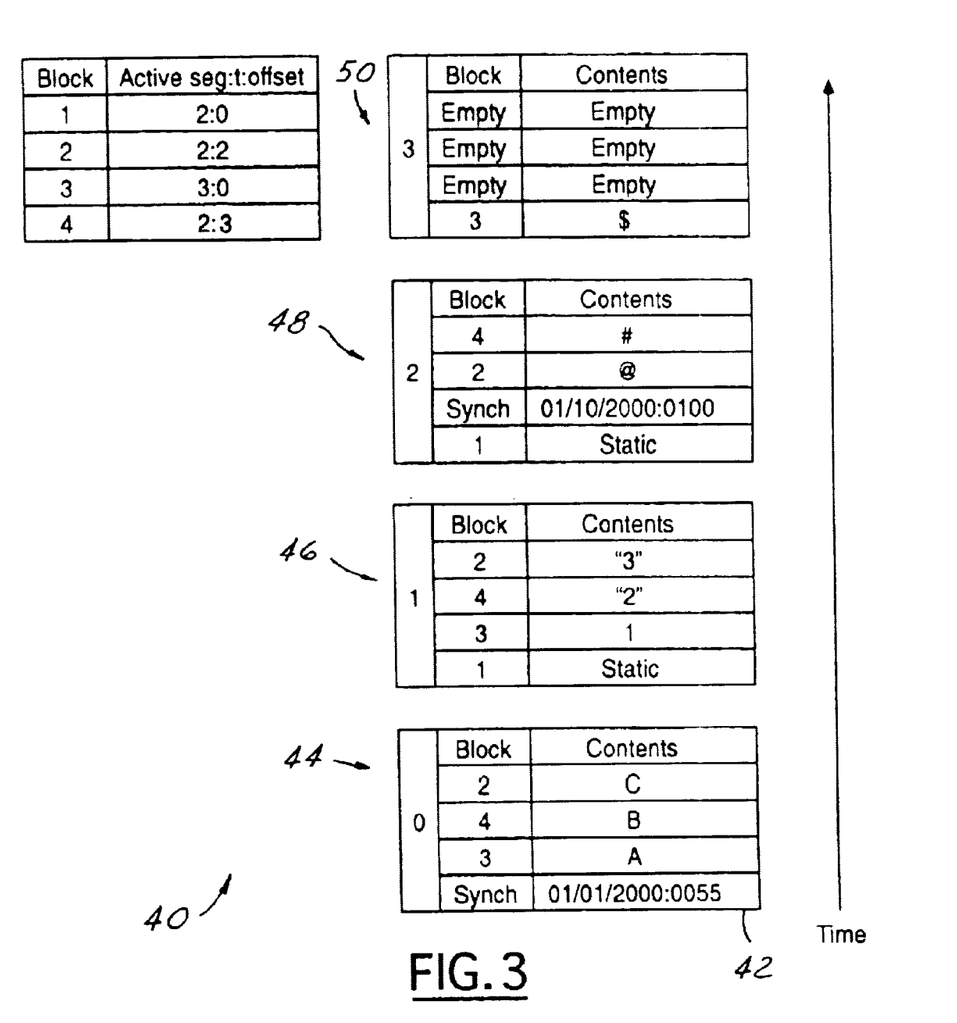
FIG. 3 illustrates a journaling algorithm used by the self archiving log structured volume.

Referring now to FIG. 3 with continual reference to FIG. 2, a journaling algorithm 40 used by self archiving log structured volume 16 will now be described. The first action includes recording a synch event 42 to begin the volume. Synch event 42 is done at time "01/01/2000:0055" at the initial starting time 44. At the initial starting time 44 the contents of blocks 2, 4, and 3 are C, B, and A, respectively. Blocks 2, 4, and 3 are then filled with A, B, and C, respectively, and block 1 is filled with static content at the next time 46. Block 3 is then replaced with "1". The second action at subsequent time 48 includes replacing blocks 4 and 2 with "2" and "3", respectively. Segment 2 becomes the current segment, because segment 1 is now full. Segment 0 is set to archive status and any blocks in segment 0 which are still referenced in the index are moved to segment 2. Block 1 is moved to segment 2 at this point. This preserves the reconstruction length assertion and allows segment 0 to be archived. Next, a synch event is recorded at time "01/10/2000:0100". Subsequent actions include replacing blocks 2, 4, and 3 with @, #, and $.

Figure 4:
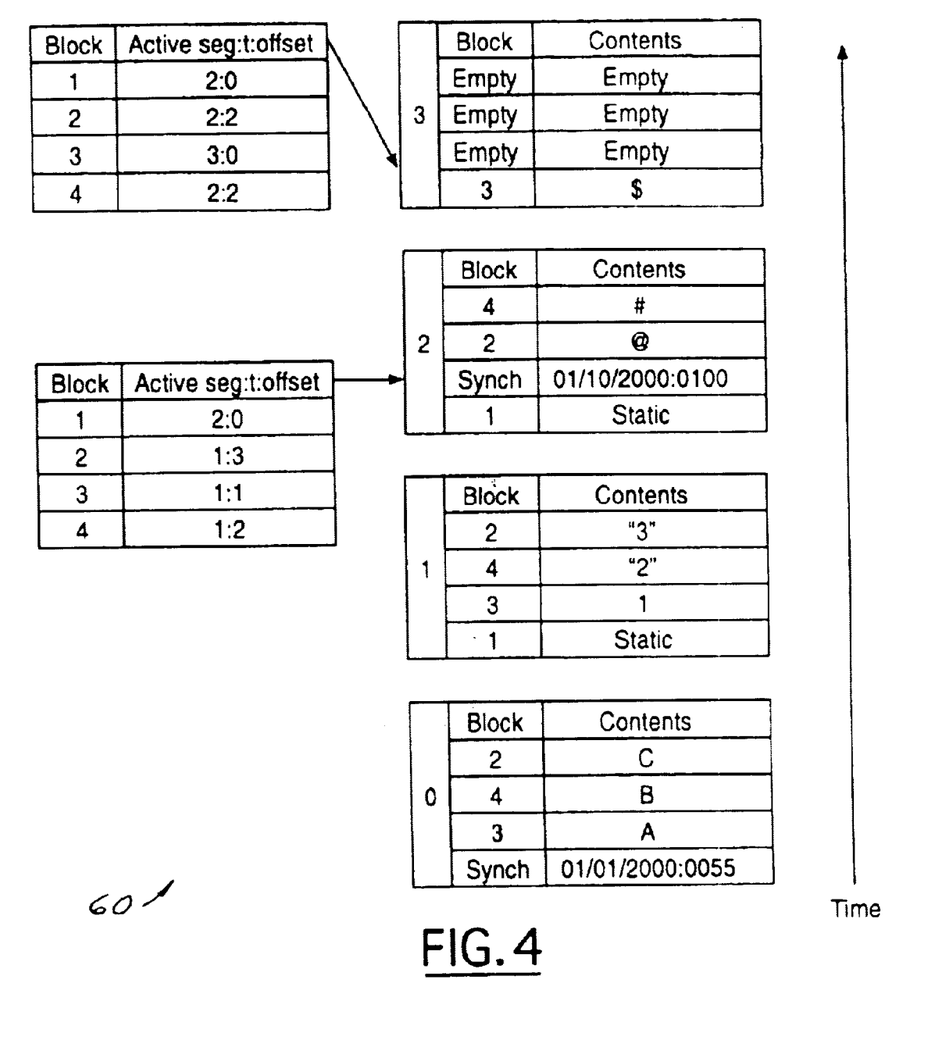
FIG. 4 illustrates a synch event logging algorithm used by the self archiving log structured volume.

Referring now to FIG. 4 with continual reference to FIG. 2, a synch event recording algorithm 60 used by self archiving log structured volume 16 will now be described. To create a synch event of a volume at a point in time an agent of data backup system 10 which can communicate with both self archiving log structured volume 16 and storage application 14 must a) detect that the storage application has put the volume in a consistent state, or b) command the storage application to put the volume in a consistent state, and subsequently detect the completion of the command. The agent then notifies the virtual volume manager, a component of self archiving log structured volume 16. At that time the virtual volume manager places a special synch block in log 22 which indicates the time that the synch occurred. After the synch event has been logged normal disk operations may resume.

To recover data, data backup system 10 must make a recovery volume 92 (shown in FIG. 1) available and request that the virtual volume manager map to the recovery volume the volume state at the desired time. The virtual volume manager must locate a synch point as close as possible to the desired time and scan log 22 backward for the reconstruction length to build the index which services the subsequent read requests on recovery volume 92. Recovery volume 92 is read by storage application 14 by any of the same means it would use to access data on a normal volume.

Figure 5:
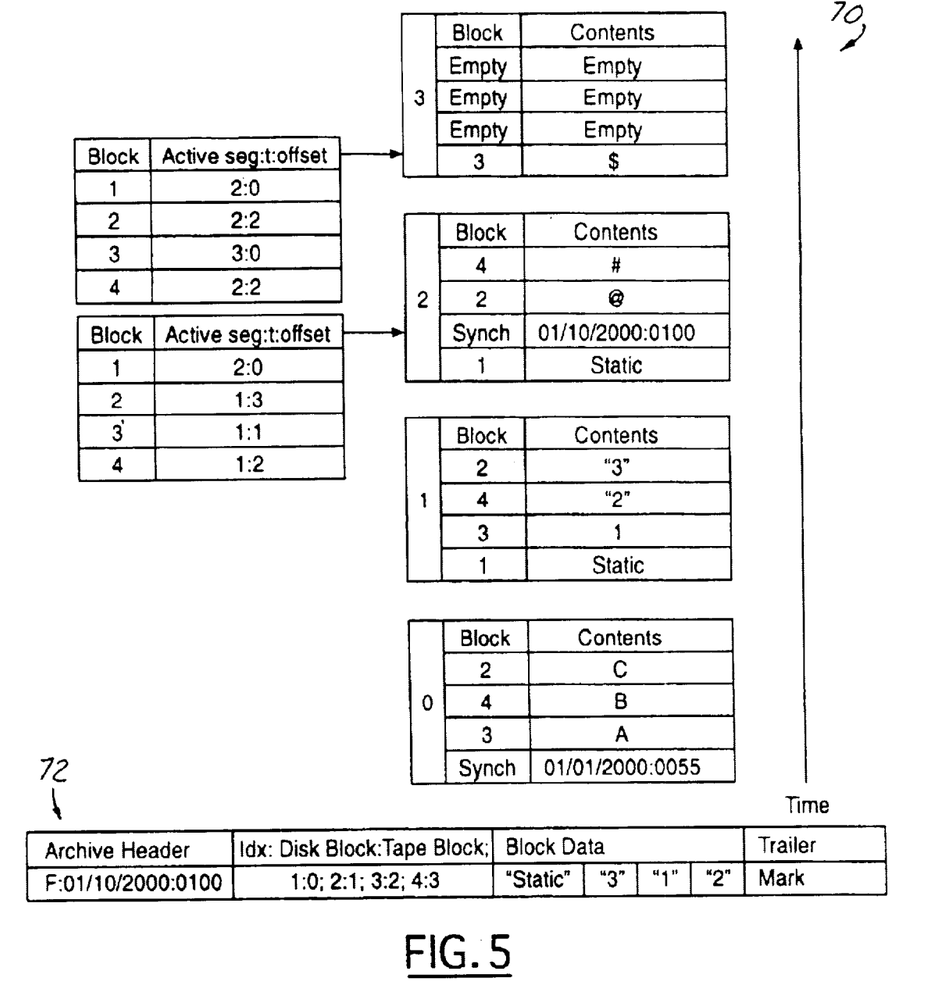
FIG. 5 illustrates a full archive algorithm used by the self archiving log structured volume.

Referring now to FIG. 5 with continual reference to FIG. 2, the organization of data on backing storage 20 is illustrated. The archive header identifies the earliest point in time on backing storage 20. Backing storage 20 contains an index of each archived segment, followed by the blocks of the segment. In this illustration, all blocks in each archived segment are copied.

Figure 6:
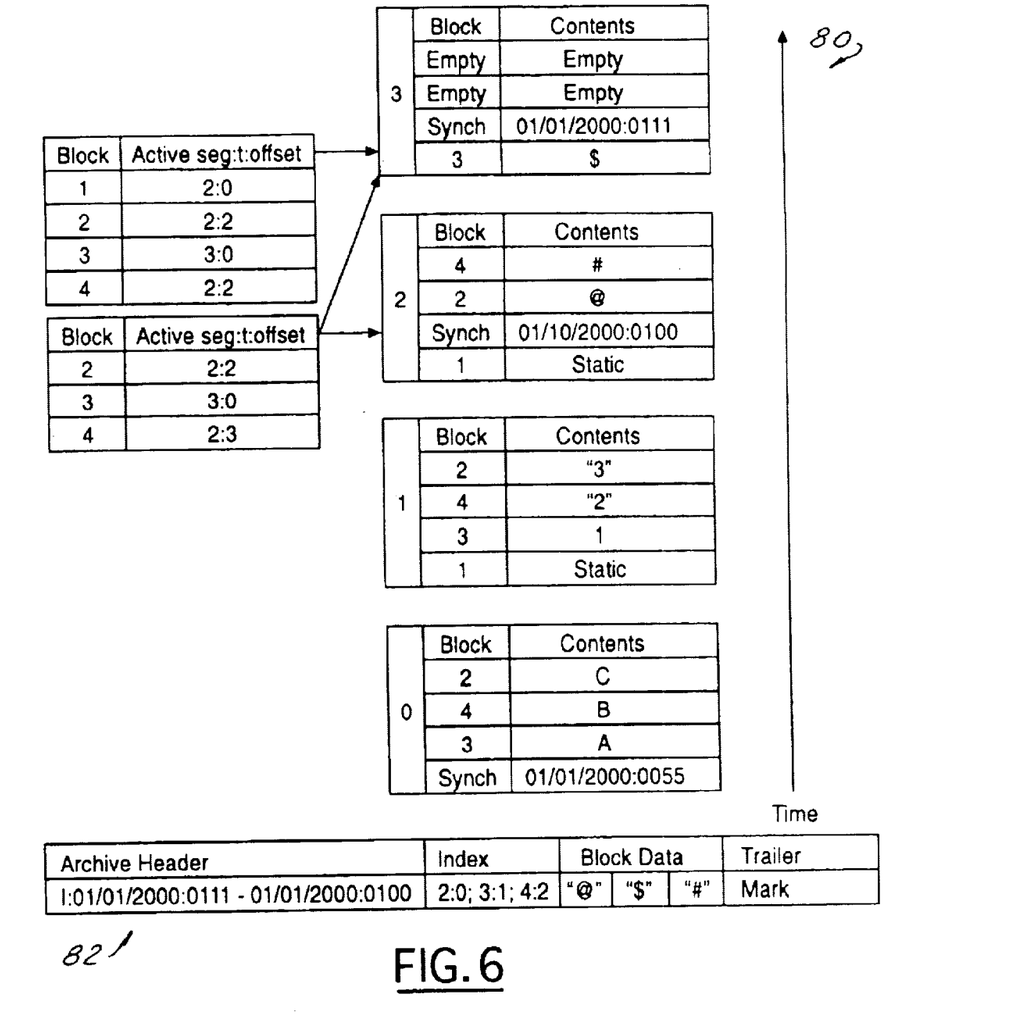
FIG. 6 illustrates an incremental archive algorithm used by the self archiving log structured volume.

Referring now to FIG. 6 with continual reference to FIG. 2, a compressing archive algorithm 80 used by self archiving log structured volume 16 will now be described. To produce a compressed archive from "01/01/2000:0111" to "01/01/2000:0100" an empty index is initially created. The index is then built by scanning backward through the segments being archived from one synch point to a previous synch point while discarding duplicate entries for the same block. The index and the blocks which were not discarded are written to tape 82 (storage) with an incremental archive header.

Figure 7:
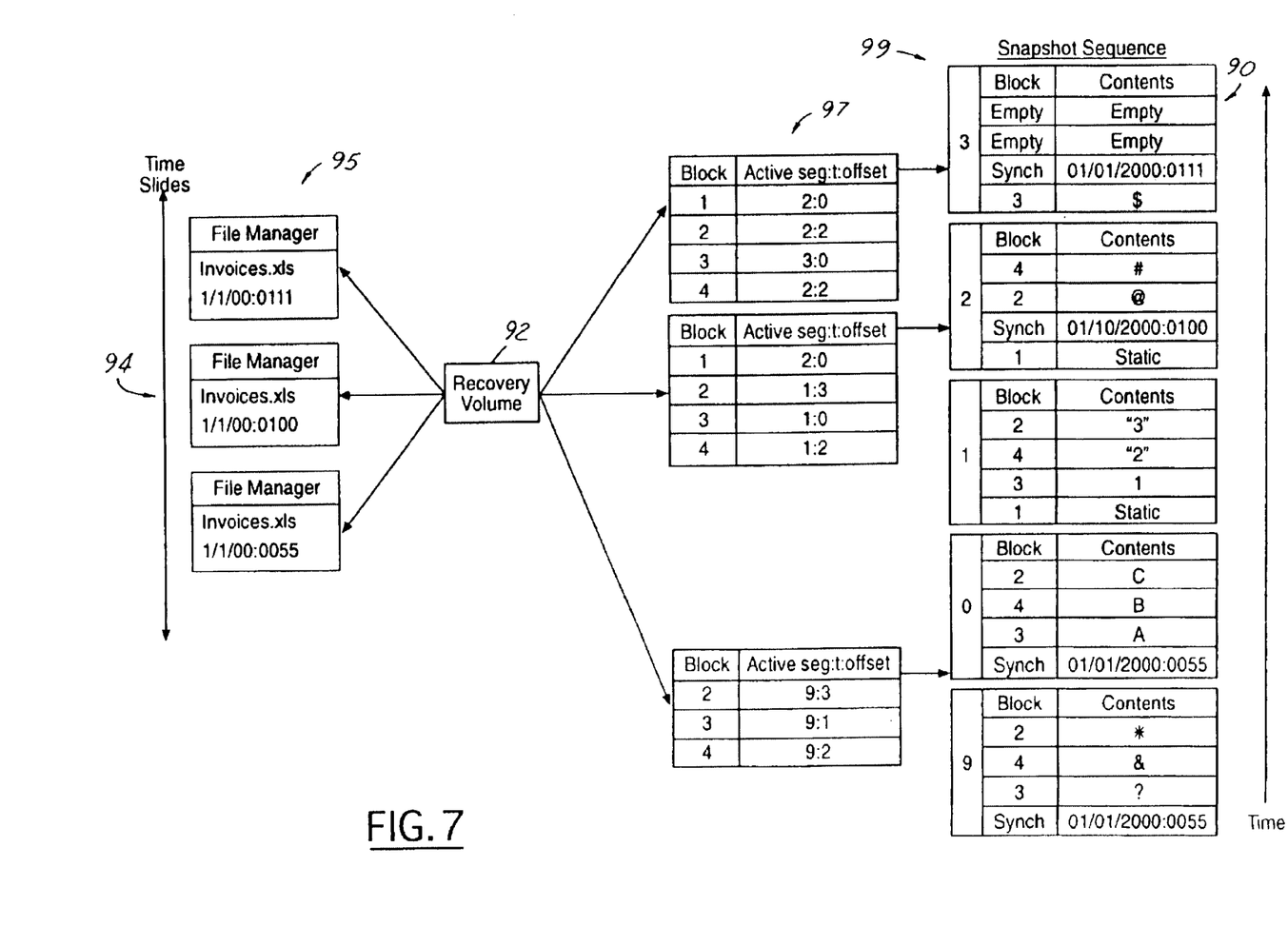
FIG. 7 illustrates a sliding restore algorithm used in a recovery volume with a snapshot sequence.

Referring now to FIG. 7 with continual reference to FIG. 2, a sliding restore algorithm 90 used by self archiving log structured volume 16 will now be described. To allow storage application 14 to step back in time data backup system 10 defines a recovery volume 92 on primary storage 18. A portion of log 22 representing a point in time or an interval of time is restored to recovery volume 92. Recovery volume 92 can create an index based on any synch point in the restored log, so long as that synch point is at least one reconstruction length away from the beginning of the restored portion of the log. The restored portion of log 22 may exceed one reconstruction length. An agent communicating with a user, storage application 14, and recovery volume 92 can allow the user to cause the index to be moved from one synch to another causing the point in time presented to storage application 14 to change rapidly.

As shown in FIG. 7, time slides 95 represent different views of data objects seen by storage application 14 depending on the state of the index. Different indexes 97 are presented depending upon the point in time to be viewed. Snapshot sequences 99 correspond to indexes 97 for each point in time.

Figure 8:
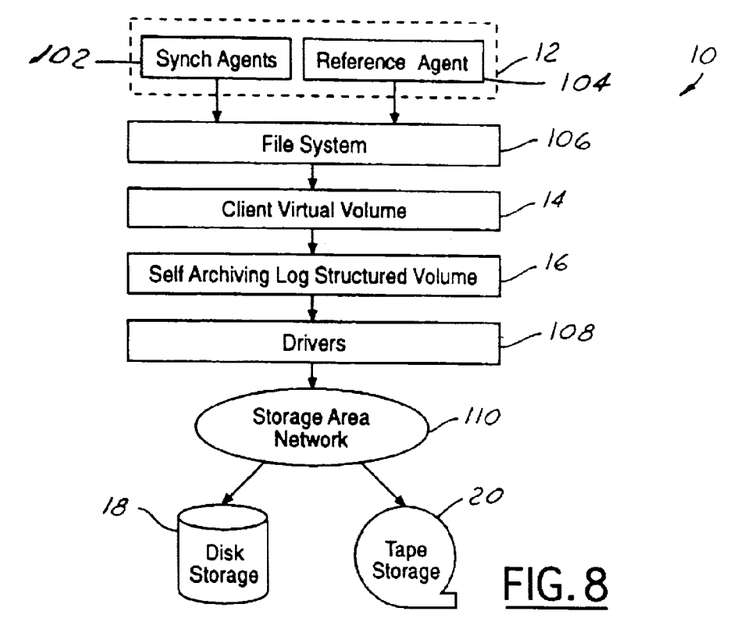
FIG. 8 illustrates a block diagram of the self protecting data backup system shown in FIG. 1 in greater detail.

Referring now to FIG. 8 with continual reference to FIGS. 1 and 2, a block diagram of self protecting data backup system 10 in greater detail is shown. A server 12 includes synch agents 102 and a reference agent 104 and operates on a file system 106. A plurality of drivers 108 are interposed between self archiving log structured volume 16 and a storage area network 110.

Figure 9:
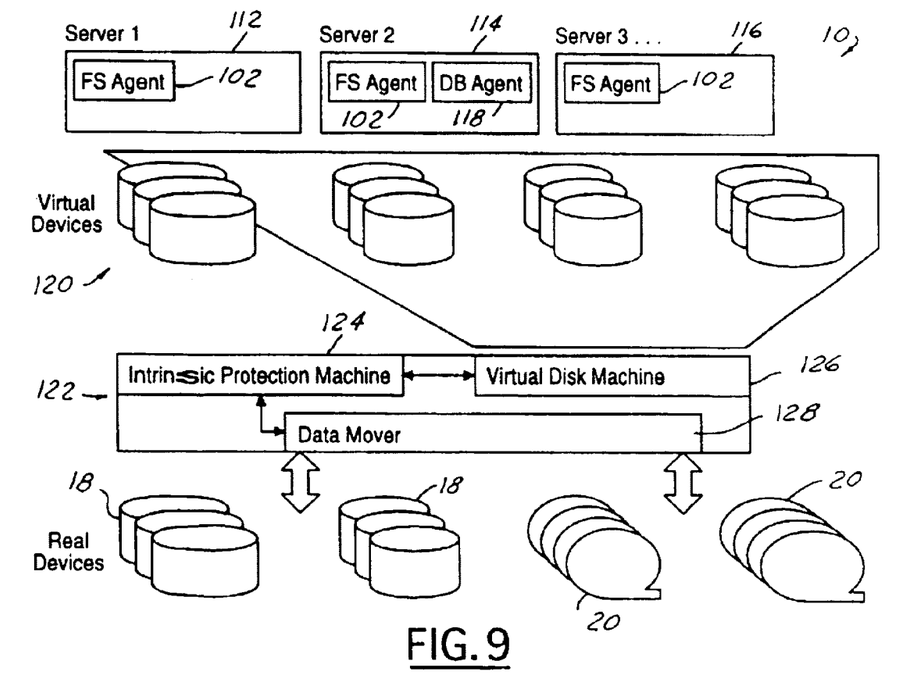
FIG. 9 illustrates a block diagram of the self protecting data backup system shown in FIG. 1 in a multiple server system environment with a storage area network.

Referring now to FIG. 9 with continual reference to FIGS. 1 and 2, a block diagram of self protecting data backup system 10 in a multiple server system environment with a storage area network is shown. A multiple of servers 112, 114, and 116 are operable with data backup system 10. Each server 112, 114, and 116 includes a synch agent 102. Server 114 includes a database agent 118. This illustrates that, depending on the storage application owning each volume, different types of synch agents will be required. Virtual devices 120 contain the client virtual volumes 14 for the servers. A self protecting storage device 122 includes an intrinsic data protection mechanism 124, a virtual disk machine 126, and a data mover 128. Data intrinsic protection machine 124 includes the working algorithm management for managing and archiving the log used by virtual disk machine 126. Virtual disk machine 126 includes self archiving log structured volume 16, using logical partitions of primary storage 18. Data mover 128 moves archived data from primary storage 18 to backing storage 20 in accordance with the operations carried out under the control of data intrinsic protection machine 124.

In operation, data changes that begin at servers 112, 114, and 116 on the client virtual volumes 14 contained in virtual devices 120 are captured by self protecting storage device 122. Self protecting storage device 122 captures the changes for continuous serverless data protection. The changes are journaled to primary storage 18 by self protecting storage mechanism 122 and then migrated to backing storage 20.

Thus it is apparent that there has been provided, in accordance with the present invention, a self protecting storage method and system for backing up data which uses a self archiving log structured volume that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for backing up data using a self archiving log structured volume having a sequence of numbered blocks of fixed length and a log for recording log entries of write events and synch events to the volume, wherein the log includes synch event entries, active log entries, and inactive log entries, the method comprising:

performing a write event by copying data to a sequence of the blocks of the volume, wherein each write event entry includes the number of the block being written and the contents of the block being transferred;

performing a synch event to record a point in time when the blocks of the volume were known to be in a consistent state, wherein each synch event entry includes the time of the synch event;

performing a log entry for a write event, wherein a log entry for a write event is an active log entry until superseded by a later write event for the same block number and then the active log entry becomes an inactive log entry, wherein when an active segment consists only of inactive entries and synch entries the active segment becomes an inactive segment eligible to be archived;

archiving an inactive segment to backing storage;

converting the archived inactive segment to a recycle segment containing no entries and eligible to become the new current segment, wherein the current log segment and the active log segment define a finite reconstruction length for the volume;

recording index entries in an index of the log, each index entry associated with a volume block number and a corresponding log entry;

satisfying write events by adding an entry for a block of the volume to the current log segment and updating the index entry for the block number with the log location of the new log entry; and performing a snapshot of the volume, wherein a snapshot of the volume is a record of the state of the volume at a selected point in the log and is created by filling the index with block/log position relationships from the log entries to the index, scanning backwards in time from the selected point, and ignoring any duplicate entries for a block that occur earlier in the log, wherein if the selected point is a synch entry the snapshot is consistent with respect to a storage application that controls the volume.

2. The method of 1 further comprising:

terminating the scan when the reconstruction length from the selected point is exceeded.

3. The method of claim 2 further comprising:

performing a snapshot sequence for an interval (TN) from a beginning time (TB) to an ending time (TE) by adding to a snapshot of time TE all of the log entries occurring between the beginning time and the ending time.

4. The method of claim 3 further comprising:

rebuilding the index by scanning the log forward in time from the beginning time to an intermediate time and replacing any index entries that have been superceded for moving forward in time.

5. The method of claim 3 further comprising:

scanning the log backwards from an intermediate time to a beginning time for moving backwards in time.

6. The method of claim 1 wherein:

inactive log entries are archived to backing storage without knowledge of a storage application owning the volume because the log organization eliminates the possibility of contention for the same blocks between the storage application and the archiving process.

* * * * *